United States Patent
Sundel et al.

(10) Patent No.: US 9,848,312 B2
(45) Date of Patent: Dec. 19, 2017

(54) PERSONAL SAFETY MONITORING

(71) Applicant: Motorola Mobility LLC, Chicago, IL (US)

(72) Inventors: Ariel P Sundel, Chicago, IL (US); Heather G Dowdy, Chicago, IL (US); Sambhavi Jayavelan, Park Ridge, IL (US); Yukiko Kimoto, Mundelein, IL (US); Prameela Rani Patchigolla, Elk Grove Village, IL (US); Ketal Patel, Melrose Park, IL (US); Harini V Peddibhotla, Buffalo Grove, IL (US); Padmaja Putcha, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/920,921

(22) Filed: Oct. 23, 2015

(65) Prior Publication Data

US 2017/0118613 A1     Apr. 27, 2017

(51) Int. Cl.
| | |
|---|---|
| H04M 11/04 | (2006.01) |
| H04W 4/22 | (2009.01) |
| H04W 4/02 | (2009.01) |
| H04M 1/725 | (2006.01) |
| H04W 4/00 | (2009.01) |

(52) U.S. Cl.
CPC ......... *H04W 4/22* (2013.01); *H04M 1/72569* (2013.01); *H04W 4/005* (2013.01); *H04W 4/021* (2013.01)

(58) Field of Classification Search
CPC .... G06Q 50/265; H04W 88/02; H04W 76/02; B60N 2002/0268; H04M 1/72569
USPC .......... 455/521, 404.2, 456.2, 414.1, 456.3, 455/556.1, 411, 418; 340/901, 539.11, 340/539.26; 345/8, 173; 702/188; 705/2, 7.19

See application file for complete search history.

(56) References Cited

U.S. PATENT DOCUMENTS

| | | | |
|---|---|---|---|
| 2004/0119591 A1* | 6/2004 | Peeters | G08B 21/0222 340/539.26 |
| 2006/0265195 A1* | 11/2006 | Woodard | G08B 25/08 702/188 |
| 2013/0109427 A1* | 5/2013 | Matus | G08B 21/025 455/521 |
| 2014/0066097 A1* | 3/2014 | Kolodziej | H04W 4/023 455/456.3 |
| 2015/0100330 A1* | 4/2015 | Shpits | G06F 19/3493 705/2 |

(Continued)

*Primary Examiner* — Kiet Doan
(74) *Attorney, Agent, or Firm* — Amerson Law Firm, PLLC

(57) ABSTRACT

A method includes identifying a personal safety risk situation in a device. A safety alert notification is issued responsive to identifying the safety risk situation. A personal safety application including a user interface is launched on a display of the device responsive to identifying the safety risk situation. A device includes a display, at least one module to determine a location of the device, and a processor coupled to the at least one module to identify a personal safety risk situation based on the location, issue a safety alert notification responsive to identifying the safety risk situation, and launch a personal safety application including a user interface displayed on the display responsive to identifying the safety risk situation.

19 Claims, 2 Drawing Sheets

(56) References Cited

U.S. PATENT DOCUMENTS

| | | | |
|---|---|---|---|
| 2015/0156567 A1* | 6/2015 | Oliver | H04Q 9/00 340/870.07 |
| 2015/0237183 A1* | 8/2015 | Novet | H04M 1/72569 455/556.1 |
| 2016/0027292 A1* | 1/2016 | Kerning | G08B 25/10 455/404.2 |
| 2016/0050528 A1* | 2/2016 | Kuhlmann | H04W 4/023 455/456.2 |

* cited by examiner

PERSONAL SAFETY MONITORING

BACKGROUND

Field of the Disclosure

The disclosed subject matter relates generally to mobile computing systems and, more particularly, to monitoring a personal safety environment for a user and automatically initiating a personal safety application based on the monitoring.

Description of the Related Art

Various personal safety features are available for users of a mobile device. A user may interact with the device to call an emergency number, cause the device to emit visual or audible alerts, etc. However, such applications require the user to interact with the device to invoke the various safety applications. If the device is stowed, such as in a pocket, handbag, backpack, etc., the device is not available to assist the user in the event a safety event occurs. The time required to retrieve the device and initiate a personal safety application makes it likely that the user may not be able to react quickly enough to avert the event.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

Figure 1:
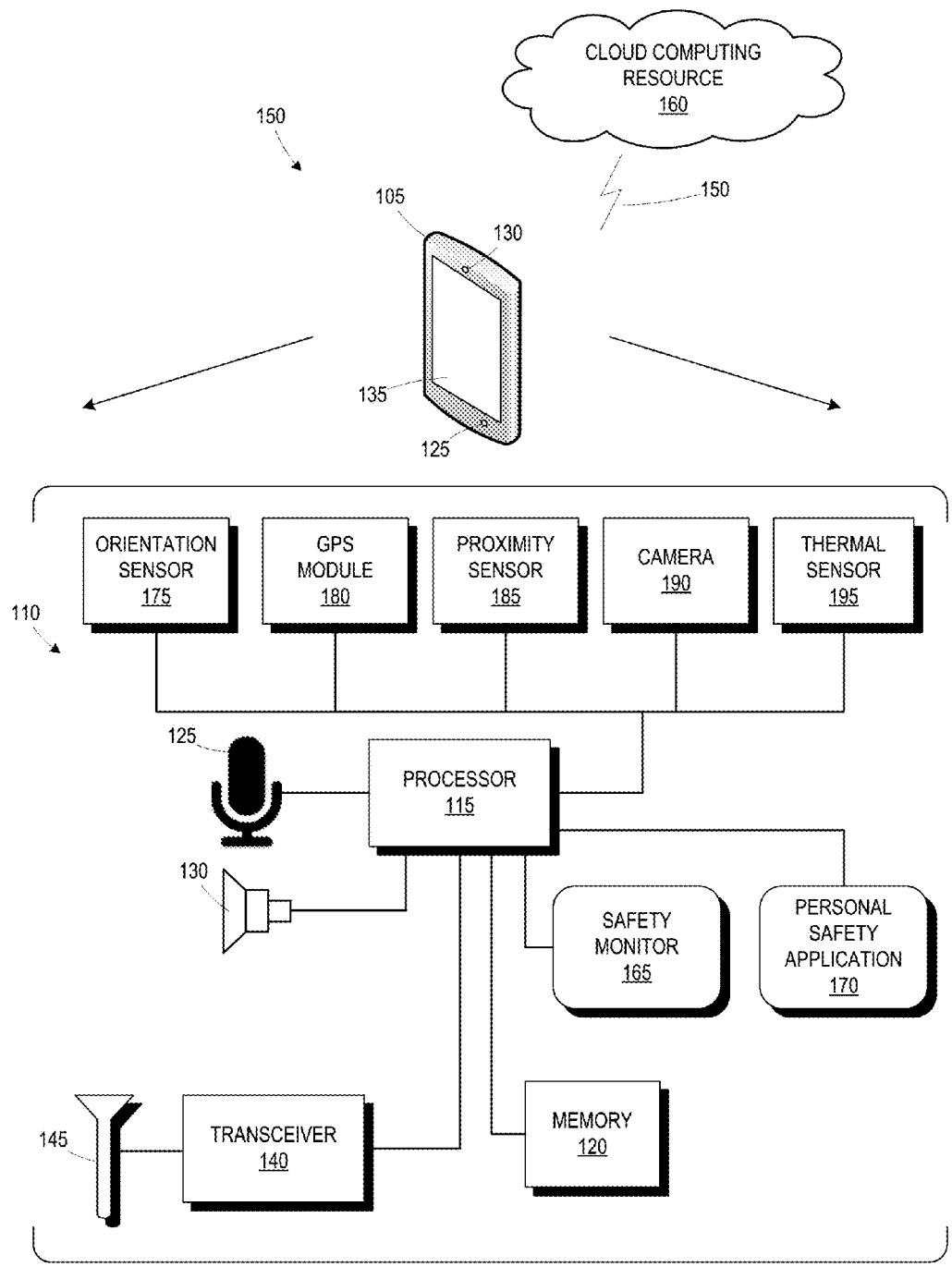
FIG. 1 is a simplified block diagram of a communication device configured to detect a personal safety risk and automatically alert the user and launch a personal safety application for use by the user, in accordance with some embodiments.
Figure 2:
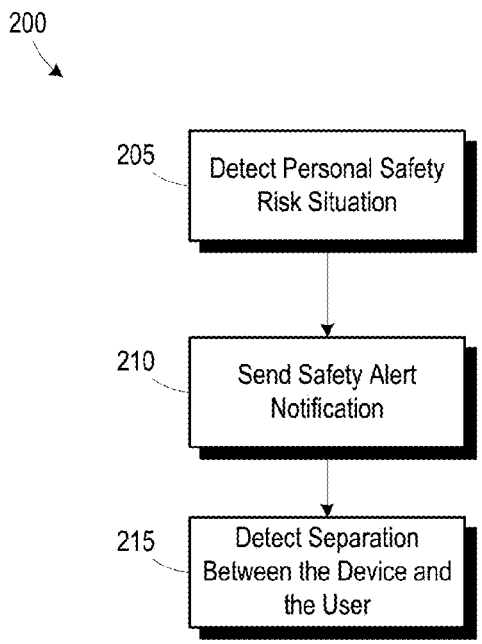
FIG. 2 is a flow diagram of a method for monitoring and responding to personal safety situations, in accordance with some embodiments.
Figure 3:
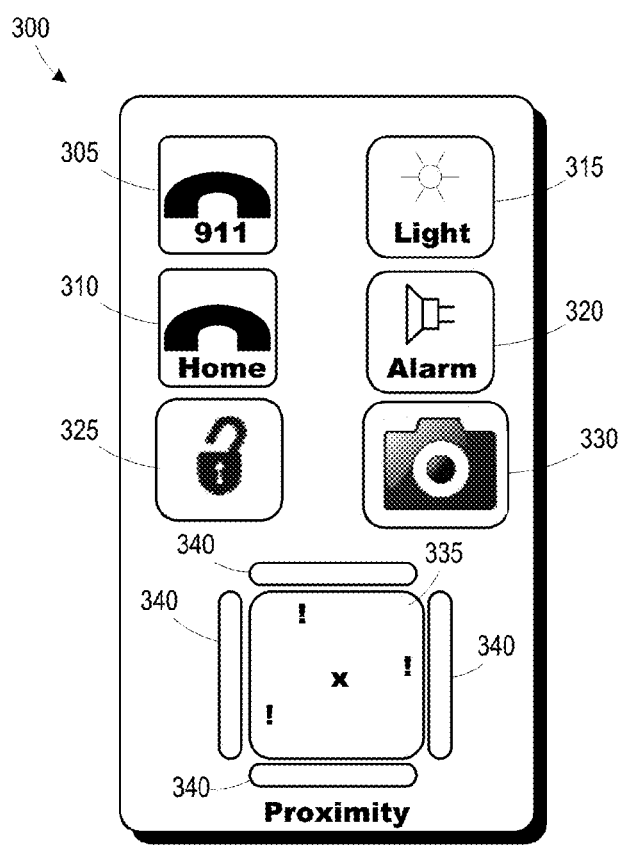
FIG. 3 is a diagram of a user interface for a personal safety application, in accordance with some embodiments.

FIGS. 1-3 illustrate example techniques for detecting a personal safety risk, alerting the user, and automatically launching a personal safety application for the user. In one example, a mobile device may detect a personal safety risk situation based on location information and alert the user. A personal safety application may be automatically launched for use by the user. The personal safety application may include features such as proximity detection, emergency call initiation, audible or visual alerts, lighting, etc. The alerting of the user allows the user to retrieve the device from a stowed position, thereby making the personal safety application available to the user.

FIG. 1 is a simplistic block diagram of a device 105. The device 105 implements a computing system 110 including, among other things, a processor 115, a memory 120, a microphone 125, a speaker 130, and a display 135. The memory 120 may be a volatile memory (e.g., DRAM, SRAM) or a non-volatile memory (e.g., ROM, flash memory, etc.), or a combination thereof. The device 105 includes a transceiver 140 for transmitting and receiving signals via an antenna 145 over a communication link 150. The transceiver 140 may include one or more radios for communicating according to different radio access technologies, such as cellular, Wi-Fi, Bluetooth®, ZigBee, etc. The communication link 150 may have a variety of forms. In some embodiments, the communication link 150 may be a wireless radio or cellular radio link. The communication link 150 may also communicate over a packet-based communication network, such as the Internet. In one embodiment, a cloud computing resource 160 may interface with the device 105 to implement one or more of the functions described herein. In various embodiments, the device 105 may be embodied in handheld or wearable devices, such as a laptop computers, handheld computers, tablet computers, mobile devices, telephones, personal data assistants, music players, game devices, wearable computing devices, and the like.

In the device 105, the processor 115 may execute instructions stored in the memory 120 and store information in the memory 120, such as the results of the executed instructions. Some embodiments of the processor 115, the memory 120, and the microphone 125 may be configured to implement a safety monitor 165 and a personal safety application 170 that perform portions of a method 200 shown in FIG. 2 and discussed below. For example, the processor 115 may execute the safety monitor 165 to detect a personal safety risk situation based on a location of the user. The safety monitor 165 may alert the user to the personal safety risk situation and automatically launch the personal safety application 170 for the user, expecting that the user will retrieve the device 105 responsive to the alert. Although the safety monitor 165 and the personal safety application 170 are illustrated as being separate applications, in some embodiments, they may be combined, such that the safety monitoring functions are conducted in the background and a user interface for personal safety is only provided in response to the identification of a personal safety risk situation (or if manually invoked by the user). One or more aspects of the method 200 may also be implemented using the cloud computing resource 160 in addition to the safety monitor 165 and the personal safety application 170.

The device 105 may be equipped with one or more sensors for use by the safety monitor 165 and the personal safety application 170, such as, for example, one or more of the following: an orientation sensor 175 (e.g., an accelerometer, magnetometer, mercury switch, gyroscope, compass, or some combination thereof) for measuring the position and/or movement of the device 105 relative to a physical reference point or surface, a global positioning system (GPS) module 180 for detecting a location of the device 105, one or more proximity sensors 185 for detecting other individuals near the device 105, a camera 190, a thermal sensor 195, etc.

In one embodiment, the proximity sensor 185 is a non-contact sensor configured to respond to a nearby heat source by providing a signal indicative of a magnitude of heat emitted by the source. Examples of suitable noncontact sensors include infrared sensors, pyroelectric sensors, digital/MEMS thermopiles and others. In general, the proximity sensor 185 functions as a thermal signal receiver that detects thermal emissions from a person. This implementation is sometimes referred to as a "passive IR system" due to the fact that the person being detected is the active transmitter. Accordingly, the proximity sensor 185 requires no transmitter, since objects disposed external to the housing deliver emissions that are received by the receiver. As no transmitter is required, each proximity sensor 185 can operate at a very low power level. In one embodiment, the signal receiver of each proximity sensor 185 can operate at various sensitivity levels so as to cause the at least one proximity sensor 185 to be operable to receive the emissions from different distances. For example, the processor 115 can cause each proximity sensor 185 to operate at a first "effective" sensitivity so as to receive emissions from a first distance. Similarly, the processor 115 can cause each proximity sensor 185 to operate at a second sensitivity, which is less than the first sensitivity, so as to receive emissions from a second distance, which is less than the first distance. The sensitivity change can be effected by causing the processor 115 to interpret readings from the proximity sensor 185 differently. For example, when the device 105 is being held, only large readings from the proximity sensor 185 might cross a less-sensitive threshold set during a held state to be used to control the device 105. In other embodiments, the proximity sensor 185 may have changing detection thresholds.

In one embodiment, the proximity sensor 185 can include at least two sets of components. For example, a first set of components can be disposed at a first corner of the device 105, while another set of components can be disposed at a second corner of the device 105. In one embodiment each component of the proximity sensor 185 can be disposed about a perimeter of the device 105. In one embodiment, the components of the proximity sensor 185 can be disposed along the sides of the device 105 as well.

In one embodiment, component of the proximity sensor 185 includes one or more apertures through which emissions are received, thereby defining a plurality of reception beams in which emissions can be received. In one or more embodiments, to provide 360-degree coverage about the device 105, one or more of the reception beams from one component may overlap those of another component. The definition of such reception beams advantageously can enable the component of the proximity sensor 185 to detect not only the location of an object relative to the device 105, but also whether one or multiple objects are within a thermal detection radius. The use of multiple reception beams allows for the detection of multiple people about the device 105, even when those people are close to one another. In one embodiment the multiple overlapping reception beams may be employed to assess user location via triangulation. In one or more embodiments, the component of the proximity sensor 185 can also detect changes across reception beams to detect motion.

FIG. 2 is a flow diagram of a method for monitoring and responding to personal safety situations, in accordance with some embodiments. In method block 200, the safety monitor 165 detects a personal safety risk situation. In some embodiments, the physical location of the device 105 is sufficient to identify the personal safety risk situation. For example, location information from the GPS module 180 may allow the safety monitor 165 to identify that the user is in an area with an increased crime rate. The safety monitor 165 may access the cloud computing resource 160 to allow a crime metric to be determined based on the location of the device 105. In some embodiments time of day may also be incorporated into the detection of the personal safety risk situation. For example, the location and the time of day may be employed.

In some locations, such as in a building, parking structure, etc., GPS data may not be available. Location data may also be determined based on data from an access point (not shown) for a communications network communicating with the device 105 over the communication link 150. For example, signals from multiple sources (e.g., cellular or Wi-Fi access points) may be triangulated to determine a location. The particular network that the device 105 is connected to using the communication link 150 may also identify the location, such as home, work, public location, etc., or provide the approximate location of the device 105. The identifying of the personal safety risk situation may be based on the device 105 initiating or terminating a network connection. For example, if the device 105 loses a connection with a network, it is likely that the user has left the office or other known public location, such as a retail establishment, restaurant, or coffee shop. If GPS position is unavailable when the network connection is terminated, the network change information suggests that the user may be in a parking structure. In some embodiments, environmental data, such as external temperature recorded by the thermal sensor 195 or an image captured by the camera 190 may indicate that the device 105 has transitioned from an inside environment to an outside environment, and the environmental data may be factored into the risk assessment. In general, indirect location information may require a higher confidence level for identifying the personal safety risk situation. For example, if no GPS data is available, network termination, time of day, and environmental data may be combined to make the risk assessment.

Responsive to identifying the personal safety risk situation in method block 200, the safety monitor 165 sends a safety alert notification in method block 210, such as an audible alert on the speaker 130, a vibration alert on the device 105, or a combination of both. The purpose of the safety alert notification is to alert the user of the personal safety risk situation and cause them to retrieve the device 105 from a stowed location and place it in their hand. In some embodiments, the device 105 may determine based on information from one or more of the sensors illustrated in FIG. 1 that the device 105 is in a stowed position. In such cases, the safety monitor 165 may ignore the privacy mode of the device 105 (silenced or vibrate-only) and issue an audible alert notification to increase the likelihood that the user will recognize the alert. The type of alert notification may also be determined based on a user setting.

The safety monitor 165 automatically launches the personal safety application 170 in method block 215, such that if the user retrieves the device 105 responsive to the safety alert notification, the personal safety application 170 is available for use.

FIG. 3 is a diagram of a user interface 300 for a personal safety application, in accordance with some embodiments. The user interface 300 includes controls for invoking various features related to personal safety. The number of controls and their appearance may vary depending on the particular application. Exemplary controls include a "Call 911" control 305 for dialing 911, a "Call Home" control 310 for calling a home number, a light control 315 for enabling a flashlight or strobe light, an alarm control 320 for issuing an audible alarm and/or a visual alarm (e.g., flashing light), an unlock control 325 for unlocking the user's automobile, a camera control 330 to allow the user to take a picture (e.g., of an assailant), and a proximity control 335 that provides information to the user regarding persons detected nearby, such as a map of detected persons, a visual indication that one or more persons are nearby (e.g., red if person detected, green if no persons detected), etc. In some embodiments, the efficacy of the proximity sensor 185 may depend on the positioning of the device 105. One or more position feedback controls 340 may provide feedback to the user regarding the orientation of the device 105. Based on information, such as color, leveling bubbles, etc., provided by the position feedback controls 340, the user may orient the device 105 to provide the best positioning for the proximity sensor 185. A map may be superimposed on the proximity control 335. The user may interact with the user interface 300 to invoke various safety features.

For example, if the proximity control 335 indicates the presence of a nearby person, the user may invoke the light control 315 to illuminate the area. If a nearby person seems threatening, the user may invoke one of the call controls 305, 310 or the alarm control 320.

The personal safety functionalities described herein may vary depending on an operating mode of the device 105. For example, if the device is in drive mode or travelling greater than a predetermined speed, they are likely in a vehicle, and thereby less likely to be in a personal safety risk situation. In such modes, the safety monitor 165 may suppress the altering of the user and launching of the personal safety application 170.

Alerting the user to a personal safety risk situation and automatically launching the personal safety application 170 provides additional safety in a convenient manner, thereby improving the user experience.

In some embodiments, certain aspects of the techniques described above may be implemented by one or more processors of a processing system executing software. The method 200 described herein may be implemented by executing software on a computing device, such as the processor 115 of FIG. 1, however, such methods are not abstract in that they improve the operation of the device 105 and the user's experience when operating the device 105. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes identifying a personal safety risk situation in a device. A safety alert notification is issued responsive to identifying the safety risk situation. A personal safety application including a user interface is launched on a display of the device responsive to identifying the safety risk situation.

A device includes a display, at least one module to determine a location of the device, and a processor coupled to the at least one module to identify a personal safety risk situation based on the location, issue a safety alert notification responsive to identifying the safety risk situation, and launch a personal safety application including a user interface displayed on the display responsive to identifying the safety risk situation.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
    automatically identifying a personal safety risk situation in a device based on at least a location of the device;
    issuing a safety alert notification to a user of the device responsive to identifying the safety risk situation;
    automatically launching a personal safety application including a user interface on a display of the device responsive to identifying the safety risk situation;
    displaying a proximity control on the user interface;
    detecting a nearby person using a thermal proximity sensor on the device; and
    indicating the detection of the nearby person on the proximity control displayed on the user interface.

2. The method of claim 1, further comprising identifying the personal safety risk situation based on a crime metric in the location.

3. The method of claim 1, further comprising determining the location using global positioning system data.

4. The method of claim 1, further comprising determining the location based on data provided by a communications network communicating with the device.

5. The method of claim 4, wherein identifying the personal safety risk situation comprises identifying the personal safety risk situation responsive to terminating a connection with the communications network.

6. The method of claim 1, wherein identifying the personal safety risk situation comprises identifying the personal safety risk situation based on the location of the device and a time parameter.

7. The method of claim 1, further comprising providing at least one personal safety control on the user interface of the personal safety application.

8. The method of claim 7, wherein the at least one personal safety control comprises a call control, a light control, an alarm control, an unlock control, or a camera control.

9. The method of claim 1, further comprising providing feedback to the user on the display regarding a positioning of the device by the user relative to an efficacy of the thermal proximity sensor.

10. A device, comprising:
a display;
at least one module to determine a location of the device; and
a processor coupled to the at least one module to automatically identify a personal safety risk situation based on at least the location, issue a safety alert notification to a user of the device responsive to identifying the safety risk situation, automatically launch a personal safety application including a user interface displayed on the display responsive to identifying the safety risk situation, display a proximity control on the user interface, detect a nearby person using a thermal proximity sensor on the device, and indicate the detection of the nearby person on the proximity control displayed on the user interface.

11. The device of claim 10, wherein the processor is to identify the personal safety risk situation based on a crime metric in the location.

12. The device of claim 11, wherein the at least one module comprises a global positioning system module.

13. The device of claim 10, wherein the at least one module includes a transceiver to establish a connection to a communications network, and the processor is to determine the location based on data provided by the communications network.

14. The device of claim 13, wherein the processor is to identify the personal safety risk situation responsive to terminating a connection with the communications network.

15. The device of claim 14, wherein the processor is to identify the personal safety risk situation responsive to the terminating of the connection and a time parameter.

16. The device of claim 10, wherein the processor is to identify the personal safety risk situation based on the location of the device and a time parameter.

17. The device of claim 10, wherein the user interface comprises at least one personal safety control.

18. The device of claim 17, wherein the at least one personal safety control comprises a call control, a light control, an alarm control, an unlock control, or a camera control.

19. The device of claim 10, wherein the processor is to provide feedback to the user on the display regarding a positioning of the device by the user relative to an efficacy of the thermal proximity sensor.

* * * * *